(12) United States Patent
Stauffer et al.

(10) Patent No.: US 6,918,191 B2
(45) Date of Patent: Jul. 19, 2005

(54) DUEL OPTION TAPE MEASURE

(76) Inventors: Gene Stauffer, 5013 E. Platteview Dr., P.O. Box 126, Cedar Creek, NE (US) 68016; Stephen Goecke, 5011 E. Platteview Dr., P.O. Box 137, Cedar Creek, NE (US) 68016

( * ) Notice: Subject to any disclaimer, the term of this patent is extended or adjusted under 35 U.S.C. 154(b) by 0 days.

(21) Appl. No.: 10/700,943

(22) Filed: Oct. 31, 2003

(65) Prior Publication Data

US 2005/0028396 A1 Feb. 10, 2005

Related U.S. Application Data

(60) Provisional application No. 60/492,623, filed on Aug. 5, 2003.

(51) Int. Cl.[7] .............................. G01B 3/10; G01B 3/06
(52) U.S. Cl. .............................. 33/766; 33/761; 33/764; 33/768; 33/770
(58) Field of Search .................... 33/755, 759, 761, 33/764, 766, 768, 769, 770, 494, 484

(56) References Cited

U.S. PATENT DOCUMENTS

| | | | | |
|---|---|---|---|---|
| 2,022,756 A | * | 12/1935 | Buck et al. ............... | 33/766 |
| 2,063,422 A | * | 12/1936 | Farrand .................... | 33/768 |
| 2,156,905 A | * | 5/1939 | Stowell et al. ............. | 33/766 |
| 2,240,753 A | * | 5/1941 | Bouchard et al. .......... | 33/764 |
| 3,087,251 A | * | 4/1963 | Betz ........................ | 33/766 |
| 4,977,684 A | * | 12/1990 | Mosman .................... | 33/766 |
| 5,016,360 A | * | 5/1991 | Starcevich ................. | 33/770 |
| 5,815,940 A | * | 10/1998 | Valentine, Sr. ............ | 33/770 |
| 5,842,284 A | * | 12/1998 | Goldman ................... | 33/759 |

* cited by examiner

*Primary Examiner*—Christopher W. Fulton
*Assistant Examiner*—Madeline Gonzalez
(74) *Attorney, Agent, or Firm*—Adam H. Jacobs

(57) ABSTRACT

A linear measuring device includes a tape housing and a semi-flexible measuring tape housed within the tape housing in a generally spiral configuration with an outer end extendable through a tape outlet opening. An extendable generally flat rear tail is movably mounted on the tape housing generally opposite the tape outlet opening and a generally flat forward tongue is mounted on and extends forwards from the outer end of the measuring tape. Finally, two sets of measurements are displayed on the measuring tape, the outer measurement set displaying the total extended distance of the measuring tape from the outer end to the tape outlet opening and the inner measurement set displaying the total distance from the outer end of the rear tail to the outer end of the forward tongue such that outer and inner measurements are simultaneously displayed on the measuring tape.

6 Claims, 5 Drawing Sheets

DUEL OPTION TAPE MEASURE

CROSS-REFERENCE TO RELATED PROVISIONAL APPLICATION

This application claims priority to the filing date of related provisional patent application Ser. No. 60/492,623 filed Aug. 5, 2003.

BACKGROUND OF THE INVENTION

1. Technical Field

The present invention relates to tape measure devices and, more particularly, to a dual option tape measure which includes a body in which a flexible metal or plastic measuring tape is wound, a forward tongue section connected to, extending forwardly from and pivotably mounted on the outer end of the measuring tape, a rear tail section mounted on the rear of the tape measure body which is movable between extended and retracted positions, and two distinct sets of measurement numbers printed on the flexible measuring tape for instantly providing internal or external measurements, depending on the measurement reading desired.

2. Description of the Prior Art

In the construction industry, there are numerous situations where internal measurements of openings, spaces, and objects must be made, and these measurements must be accurate to ensure that the proper fitting of materials is permitted. For example, the replacement window industry involves the replacement of older, energy-inefficient windows with new, energy-efficient windows. In order to properly seat the replacement window within the window opening in the wall, extremely accurate measurements must be made, with the average tolerance being less than one quarter of one inch. If the measurement being made is off by even a little, the window which is manufactured to fit the window opening will not fit correctly and the replacement window must then be scrapped or discarded. The difficulty in measuring the window opening lies in the recesses which must be measured and the internal dimensions which must be determined in order to ensure a proper fit for the replacement window. Presently available measuring tapes do not provide accurate and easy-to-use measurements of the internal dimensions of the window opening.

Furthermore, even those devices found in the prior art which intend to solve this problem, such as Mosman, U.S. Pat. No. 4,977,684, do not fully address the issue as the resulting measurements must be added together, introducing additional potential sources of error. There is therefore a need for an easy-to-use measuring device which will permit external and internal measurements with a high degree of accuracy.

Therefore, an object of the present invention is to provide an improved dual option tape measure.

Another object of the present invention is to provide an improved dual option tape measure which may be quickly and easily used to measure both internal and external measurements of objects and openings.

Another object of the present invention is to provide an improved dual option tape measure which includes a movably mounted rear tail and a forward tongue mounted on the end of the measuring tape for measuring internal dimensions.

Another object of the present invention is to provide an improved dual option tape measure which includes two separate and distinct sets of measurements displayed on the measuring tape, the outer measurement set displaying the total extended distance of the measuring tape from the outer end to the tape outlet opening and the inner measurement set displaying the total distance from the outer end of the rear tail to the outer end of the forward tongue such that outer and inner measurements are simultaneously displayed on the measuring tape.

Another object of the present invention is to provide an improved dual option tape measure which will generally eliminate the need for two separate measuring devices to be used for inner and outer measurements.

Finally, an object of the present invention is to provide a dual option tape measure which is relatively simple and inexpensive to construct and is safe, efficient and durable in use.

SUMMARY OF THE INVENTION

The present invention provides a linear measuring device including a tape housing having an outer surface, a tape outlet opening and inner volume and a generally semi-flexible measuring tape housed within the tape housing in a generally spiral configuration with an outer end extendable through the tape outlet opening. An extendable generally flat planar rear tail having an outer end and an inner end is movably mounted on the tape housing generally opposite the tape outlet opening, the rear tail operative to project outwards from the tape housing and a generally flat planar forward tongue is mounted on and extends forwards from the outer end of the measuring tape. Finally, at least two sets of measurements are displayed on the measuring tape, an outer measurement of the two sets of measurements displaying the total extended distance of the measuring tape from the outer end of the measuring tape to the tape outlet opening and an inner measurement of the two sets of measurements displaying the total distance between the outer end of the rear tail and the outer end of the forward tongue such that outer and inner measurements are simultaneously displayed on the measuring tape.

It is thus seen that the present invention provides a substantial improvement over those inventions found in the prior art. For example, the design of the present invention permits the user to quickly and easily measure both external measurements and internal measurements and merely read the corresponding distance directly off of the measuring tape, without having to add separate measurements together. Furthermore, as the present invention is relatively simple in design and manufacture, the cost for each unit is kept relatively low which will enable the use of the present invention by many different types of users. Finally, because the present invention can be used for both internal and external measurements of objects and openings, the usefulness of the invention over those devices found in the prior art is far superior. The present invention thus provides a substantial improvement over those devices found in the prior art.

DESCRIPTION OF THE PREFERRED EMBODIMENT

The dual option tape measure 10 of the present invention is shown best in FIGS. 1–4b as including a rigid plastic or metal body 12 which encloses a generally flexible metal or plastic measuring tape 14. The body 12, measuring tape 14, lock mechanism 16, and other elements which enable the extension and retraction of measuring tape 14 from body 12 generally function in the same manner as those measuring tapes found in the prior art and therefore further discussion of the specific details of the operation of the extension, retraction, and locking elements of the measuring tape 14 of the dual option tape measure 10 of the present invention will not be undertaken at this time. Furthermore, it should be noted that numerous variations in the operating mechanisms for measuring tape devices are known in the prior art and are incorporated herein and made a part of this disclosure.

Figure 5A:
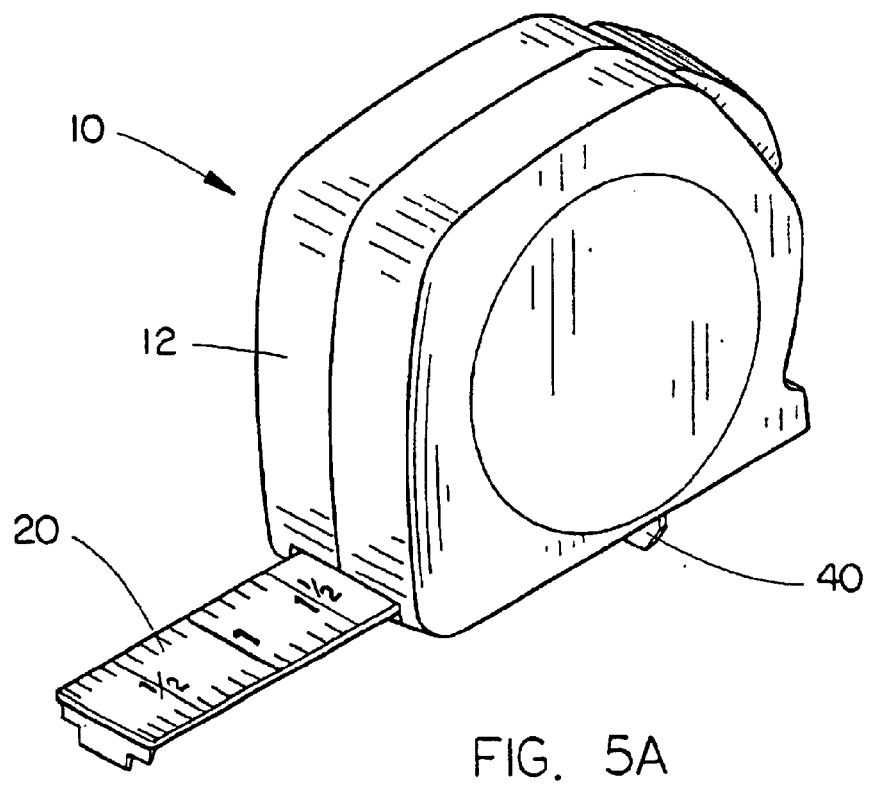
FIGS. 5a and 5b are, respectively, side elevational and perspective views of the dual option tape measure of the present invention showing the alternative embodiment with the retractable measuring tail section.
Figure 4B:
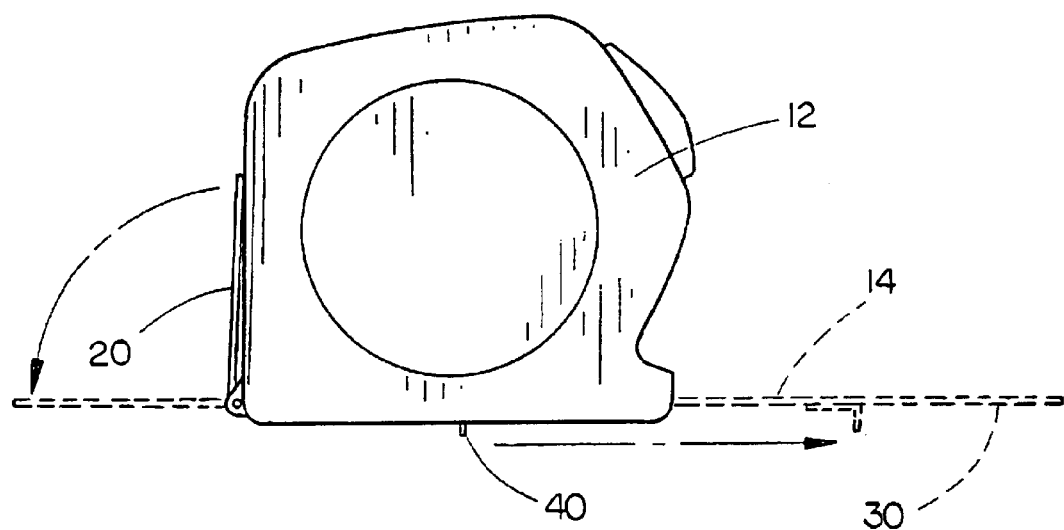
Figure 5B:
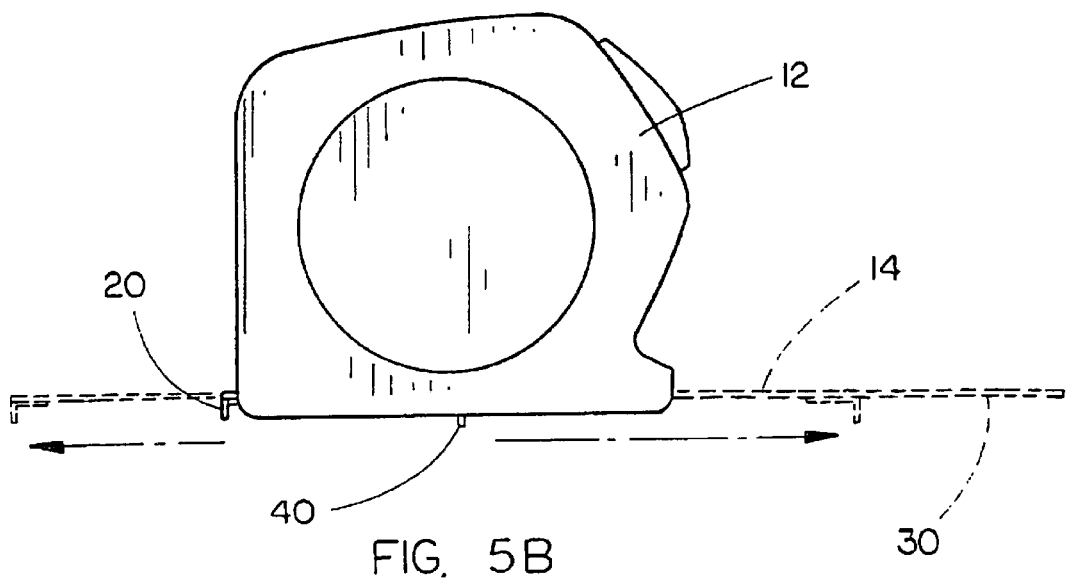

The key inventive features of the present invention are described as follows and are shown best in FIGS. 1–5b. Mounted on the rear of body 12 is measuring tail section 20 which, in the preferred embodiment, would have a length of approximately one to three inches, a width approximately equal to the width of measuring tape 14, and would be mounted to the rear of body 12 via a hinge mechanism 22 or the like. In the preferred embodiment, the hinge mechanism 22 would further include a pivot stop 24 which prevents the measuring tail section 20 from being pivoted beyond a position generally parallel with the extended section of measuring tape 14, as shown best in FIG. 2. Of course, it should be noted that, although the measuring tail section 20 of the present invention is described as being connected via a hinge mechanism 22 or the like, the measuring tail section 20 may be mounted on the body 12 in many other ways so long as the measuring tail section 20 may be moved from a retracted position which is unobtrusive and does not interfere with operation of the dual option tape measure 10 to the extended position shown best in FIG. 2 where the measuring tail section 20 extends perpendicularly outwards from body 12. For example, the measuring tail section 20 may be slidably mounted within the body 12, as shown in FIGS. 5a and 5b, such that the measuring tail section 20 may be moved from a recessed position within the body 12 to the extended position extending generally perpendicularly from the body 12. Of course, various other types of mounting arrangements may be used with the measuring tail section 20 of the present invention so long as the intended functionality is neither degraded nor destroyed.

In the preferred embodiment, measuring tail section 20 would include tail section measurement markings 26 and furthermore, the measuring tail section 20 would be constructed as a generally flat, rigid plate of metal or plastic having a relatively narrow thickness of approximately 1/32nd to 1/8th of an inch. This narrow thickness permits the measuring tail section 20 to extend into recesses and cavities to permit measurement of the depth of the recess or cavity which is read via the tail measurement markings 26 and furthermore permits use of the measuring tail section 20 in cooperation with the measuring tape 14 as will be described later in this disclosure.

Mounted on the forward end of measuring tape 14 is a measuring tongue section 30 which is preferably constructed of materials similar to that used in construction of measuring tail section 20 and would have a length of approximately one to two inches and a width approximately equal to the width of measuring tape 14. Measuring tongue section 30 would further include tongue measurement markings 32 which display the distance from the forward end of measuring tongue section 30 extending rearwards towards the body 12 of dual option tape measure 10, as shown best in FIG. 3. Mounted on and extending downwards from the connection of measuring tongue section 30 to measuring tape 14 is a measuring tape hook 40 which depends downwards from measuring tape 14 at the forward end thereof and serves the dual purpose of permitting the end of the measuring tape 14 to be hooked onto an object for measurement thereof and also prevents the measuring tape 14 from retracting into the body 12 of dual option tape measure 10 beyond a certain designated point. In fact, in the preferred embodiment of the present invention, the measuring tape hook 40 will butt up against the lower wall of body 12 at a point rearwards of the forward section of body 12 in order to permit the measuring tongue section 30 to be recessed within and protected by the body 12, as shown best in FIG. 1.

Figure 1:
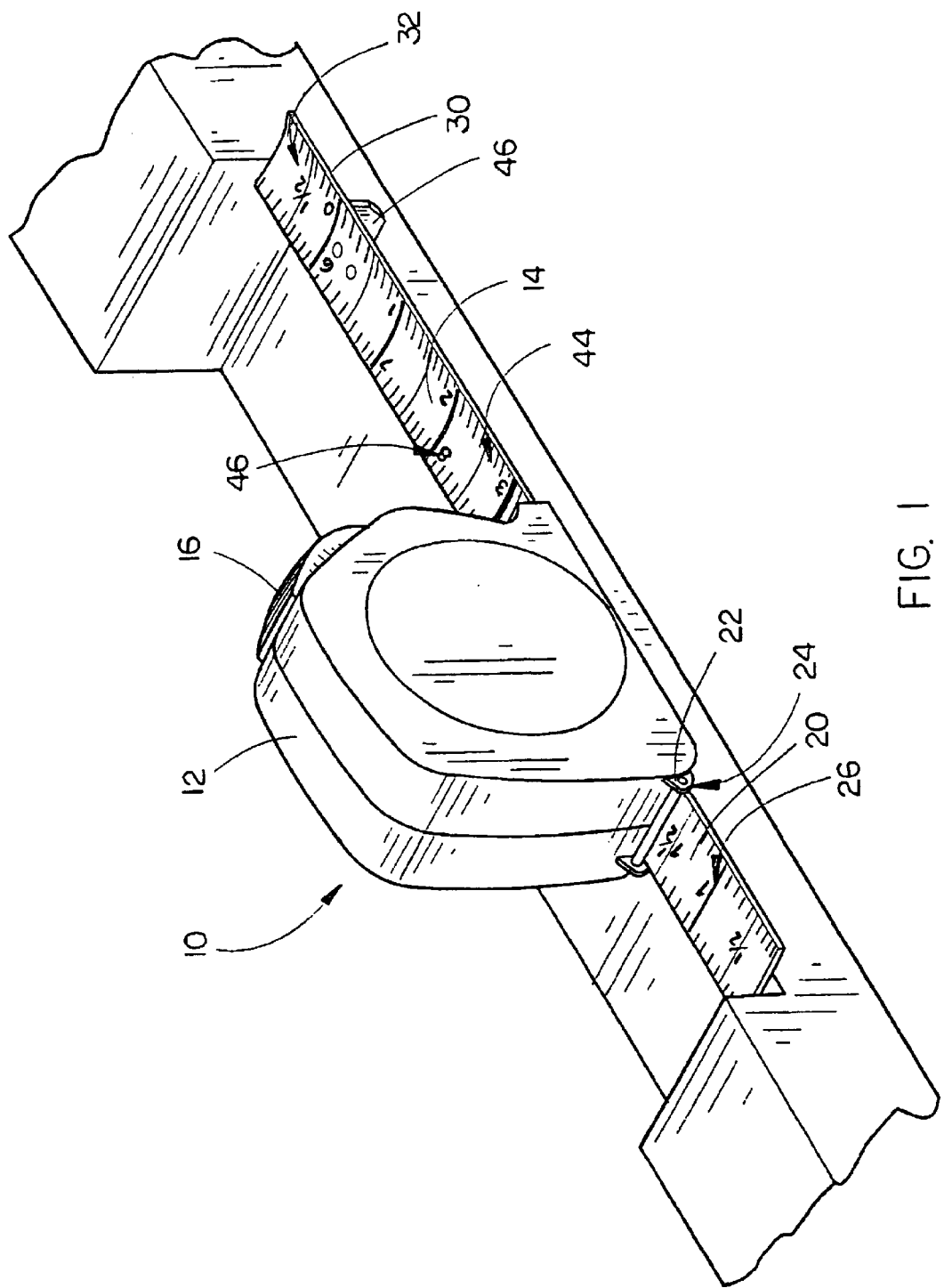
FIG. 1 is a perspective view of the dual option tape measure of the present invention.
Figure 2:
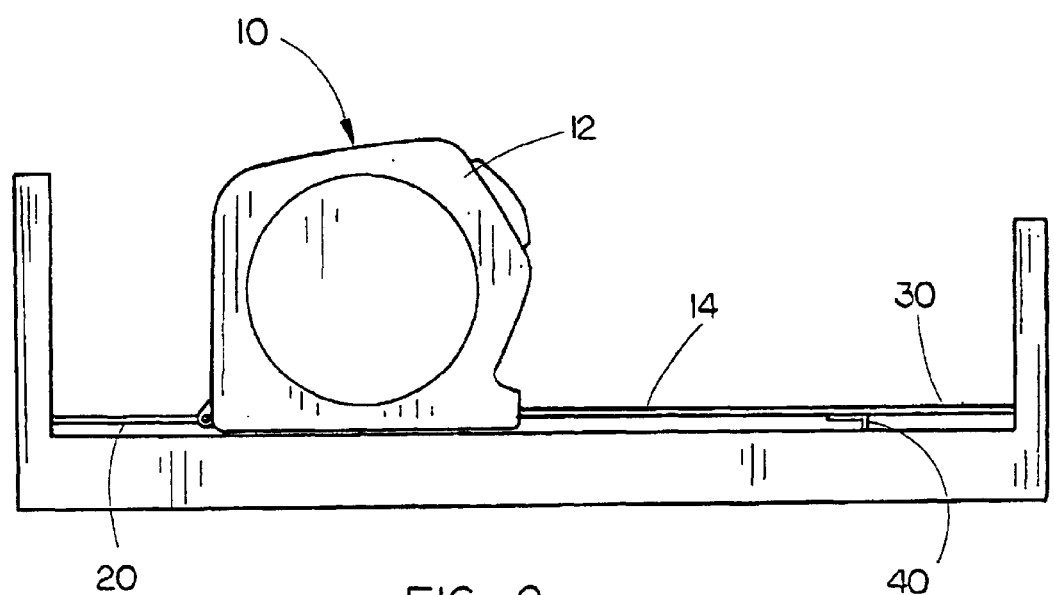
FIG. 2 is a side elevational view of the present invention measuring an internal measurement.
Figure 3:
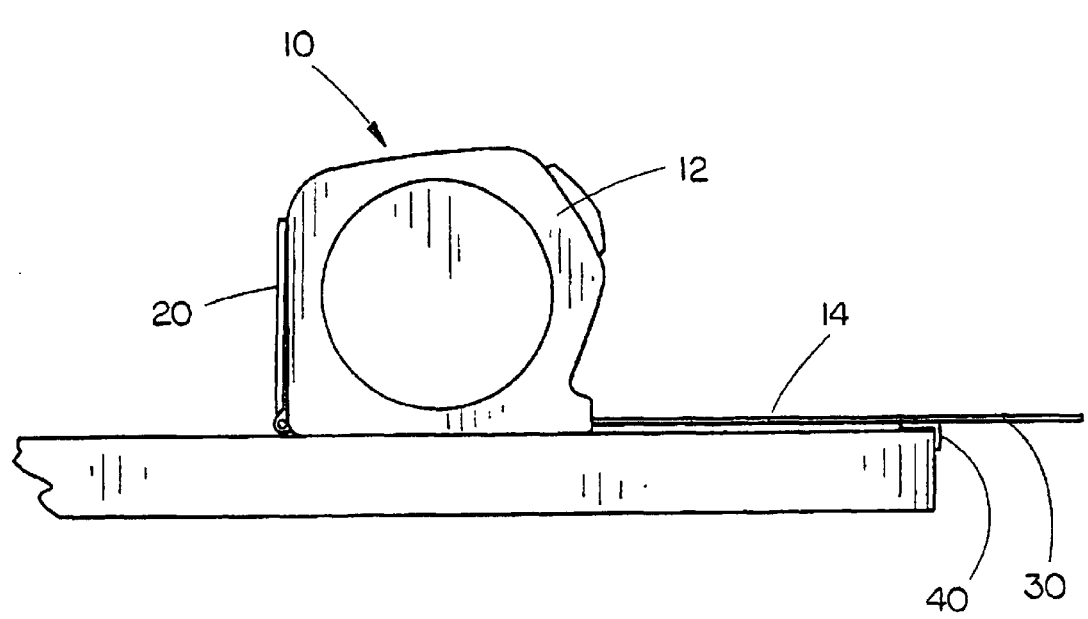
FIG. 3 is a side elevational view of the present invention measuring an external measurement.
Figure 4A:
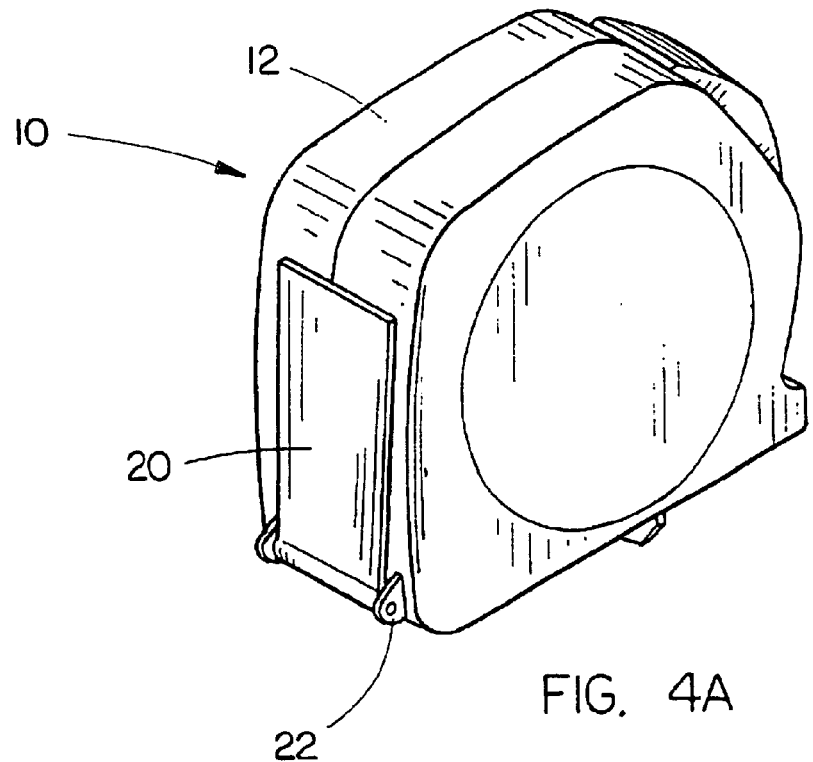
FIGS. 4a and 4b are, respectively, side elevational and perspective views of the dual option tape measure of the present invention showing the alternative embodiment with the fold-down measuring tail section.
Figure 6A:
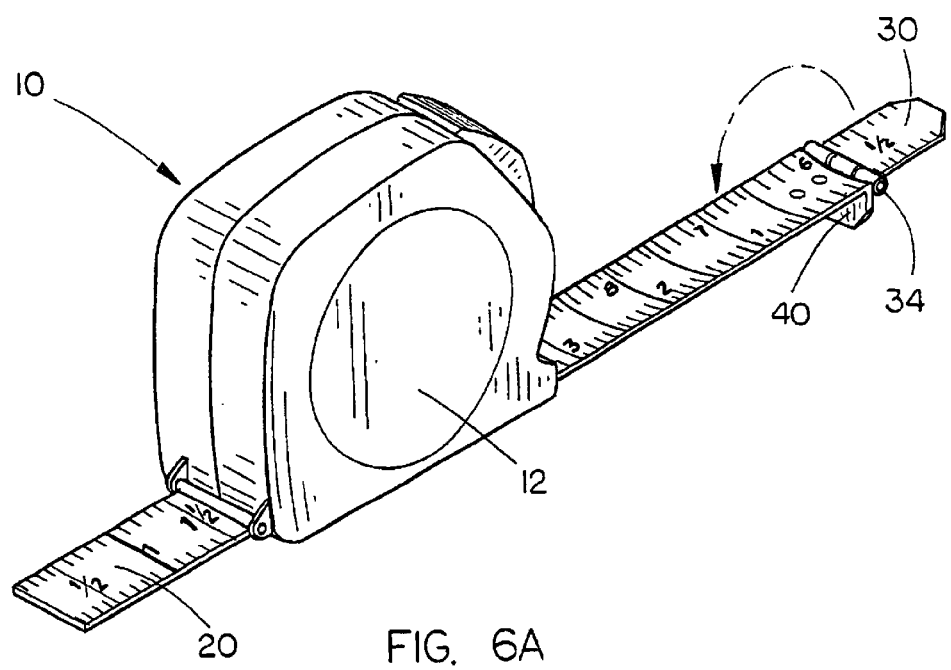
FIGS. 6a and 6b are, respectively, perspective and side elevational views of the dual option tape measure of the present invention showing the alternative embodiment with the hingedly mounted forward tongue section.
Figure 6B:
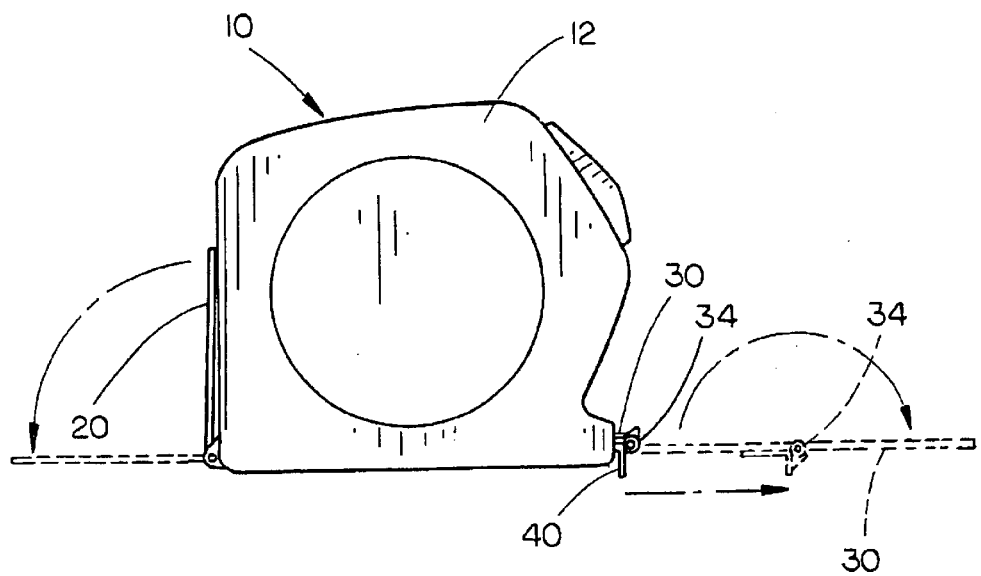

Alternatively, as shown in FIGS. 6a and 6b, the measuring tongue section 30 is connected to the forward end of the measuring tape 14 by a hinged connection 34, as shown best in FIG. 3, which permits the measuring tongue section 30 to be folded upwards against the body 12 when the measuring tongue section 30 is not being used. Also, the measuring tongue section 30 can be rotated completely around to contact the top of the measuring tape 14 thus removing the measuring tongue section 30 from interference with use of the measuring tape 14 itself. This variation of the connection of the measuring tongue section 30 to the measuring tape 14 also eliminates the need for the lower wall of body 12 to be modified to accommodate the retraction of the measuring tape hook 40 rearwards of the forward edge of body 12 to protect the measuring tongue section 30, as the measuring tongue section 30 may simply be pivoted 180° to rest against the measuring tape 14, then retracted within the body 12 as shown in FIG. 6b to prevent the measuring tongue section 30 from being damaged. Of course, other connections of the measuring tongue section 30 to the forward end of the measuring tape 14 are possible, and variations on the connection should be understood to be a part of this invention.

As was stated previously, the vast majority of measuring tapes 14 include only a single series of numbers which provide the distance from the forward end of measuring tape 14 rearwards to the location being measured. While this measurement display is acceptable for external measurements, i.e. those in which the forward end of the measuring tape 14, specifically measuring tape hook 40, is clipped onto an object and the width, height, or length of the object is then measured by the length of the measuring tape 14 such as is shown in FIG. 3, it is clear that internal measurements must be either estimated or the measuring tape 14 must be folded into the desired location, thus potentially damaging the measuring tape 14 and reducing the usable lifespan of the measuring device. The present invention solves the problem of internal measurements by providing the measuring tail section 20 and measuring tongue section 30 which may be extended into the internal measurement area to be measured and then, perhaps most importantly, providing the independent internal measurement side of the measuring tape 14 for reading the total internal measurement, as shown best in FIG. 2. To elaborate, printed on measuring tape 14 are two sets of measurements, the external measurement side 44 and the internal measurement side 46. External measurement side 44 includes a series of measurement numbers generally familiar to users of measuring tape devices which measure the distance from the measuring tape hook 40 rearwards towards the body 12 of the tape measure device. The internal measurement side 46, however, provides a measurement reading which incorporates the length of measuring tongue section 30, plus the length of measuring tail section 20, and also includes the length of body 12, and, as all of the numbers are added together and printed as the internal measurement side 46 figures, the measurement reading shown on internal measurement side 46 provides a simple, quick, and effective measurement of the internal dimensions of the recess, object, or area being measured. Prior art devices universally require the user of the device to add the various elements (body of the tape measure and tongue and/or tail sections) together and then add the distance that the measuring tape 14 is extended to determine the internal measurement. Given the difficulty of adding fractional distances and the speed with which many measurements must be made, this requirement is asking quite a bit of the user of those prior art devices. The dual option tape measure 10 of the present invention eliminates the need for those calculations to be made by providing a simple, quick, and effective internal measurement reading taken directly from the internal measurement side 46 of measuring tape 14.

It is to be understood that numerous additions, modifications, and substitutions may be made to the dual option tape measure 10 of the present invention which fall within the intended broad scope of the above description. For example, the size, shape, and construction materials used in connection with the dual option tape measure 10 may be modified or changed so long as the intended functionality is neither degraded nor destroyed. Also, the specific lengths of the measuring tongue section 30 and measuring tail section 20 may be modified or changed depending on the intended use of the dual option tape measure 10 of the present invention, as well as the connection of the measuring tongue section 30 and measuring tail section 20 to the measuring tape 14 and body 12, any of which are made a part of this disclosure. Finally, the size and shape of the measuring tongue section 30 and measuring tail section 20 may be modified or changed depending upon the desired uses of the present invention, and likewise the external measurement side 44 and internal measurement side 46 would include appropriate measurement markings dependent on the overall dimensions of the measuring tail section 20, measuring tongue section 30 and body 12.

There has therefore been shown and described a dual option tape measure 10 which accomplishes at least all of its intended objectives.

We claim:

1. A linear measuring device comprising:

a tape housing having an outer surface, a tape outlet opening and inner volume;

a generally semi-flexible measuring tape housed within said tape housing in a generally spiral configuration with an outer end extendable through said tape outlet opening;

an extendable generally flat planar rear tail having an outer end and an inner end and a fixed length as measured between said outer end and said inner end, said rear tail movably mounted on said tape housing generally opposite said tape outlet opening, said rear tail operative to project outwards from said tape housing;

a generally flat planar forward tongue having inner and outer ends, said inner end of said forward tongue hingedly mounted on said outer end of said measuring tape with said forward tongue extending forwards therefrom, said forward tongue being pivotable between a retracted position in general parallel alignment with and contacting said measuring tape and an extended position extending outwards generally parallel with said measuring tape, said outer end of said forward tongue being generally free of projecting objects mounted thereon whereby said outer end of said forward tongue is operative to be extended into narrow openings;

at least two sets of measurements displayed on said measuring tape, an outer measurement of said at least two sets of measurements displaying the total extended distance of said measuring tape from said outer end to said tape outlet opening, an inner measurement of said at least two sets of measurements displaying the total distance between said outer end of said rear tail and said outer end of said forward tongue such that outer and inner measurements are simultaneously displayed on said measuring tape; and said inner measurement including the length of said rear tail plus the length of said forward tongue plus the length of said tape housing between said tape outlet opening and the connection of said rear tail to said tape housing plus the total extended distance of said measuring tape from said outer end to said tape outlet opening ($L_{Rear\ Tail} + L_{Forward\ Tongue} + L_{Tape\ Housing} + L_{Tape}$) whereby the total distance between the outer end of said rear tail and said outer end of said forward tongue is shown by said inner measurement free of addition of the individual length measurements of each of the rear tail, forward tongue, tape housing and measuring tape.

2. The dual option tape measure of claim 1 wherein said inner end of said rear tail is hingedly mounted on said tape housing generally adjacent the lower surface of said tape housing, said rear tail pivotable between a retracted position generally adjacent said tape housing and an extended position generally parallel with said outer end of said measuring tape in the opposite direction therefrom.

3. The dual option tape measure of claim 1 wherein said inner end of said rear tail is retractably mounted within said tape housing with said outer end of said rear tail extending partially outwards from said tape housing when said rear tail is housed within said tape housing such that said outer end of said rear tail may be engaged to withdraw said rear tail from said tape housing thereby moving said rear tail into an extended position generally parallel with said outer end of said measuring tape in the opposite direction therefrom.

4. The dual option tape measure of claim 1 wherein:

said forward tongue is hingedly mounted on said outer end of said measuring tape;

said inner end of said rear tail is hingedly mounted on said tape housing generally adjacent the lower surface of said tape housing; and said hinged connection of said forward tongue and said hinged connection of said rear tail each including hinge stop means to restrict rotation of said forward tongue and said rear tail beyond an extended position for each wherein both said forward tongue and said rear tail are generally parallel with said outer end of said measuring tape for facilitating accurate measuring of inner measurements of objects to be measured.

5. A linear measuring device comprising:

a tape housing having an outer surface, a tape outlet opening and inner volume;

a generally semi-flexible measuring tape housed within said tape housing in a generally spiral configuration with an outer end extendable through said tape outlet opening;

an extendable generally flat planar rear tail having an outer end and an inner end and a fixed length as measured between said outer end and said inner end, said rear tail pivotably mounted on said tape housing generally opposite said tape outlet opening, said rear tail operative to project outwards from said tape housing;

a generally flat planar forward tongue having inner and outer ends, said inner end of said forward tongue pivotably mounted on said outer end of said measuring tape, said outer end of said forward tongue being generally free of projecting objects mounted thereon whereby said outer end of said forward tongue is operative to be extended into narrow openings, said forward tongue pivotable between a retracted position contacting said measuring tape and an extended position extending outwards from said measuring tape;

at least two sets of measurements displayed on said measuring tape, an outer measurement of said at least two sets of measurements displaying the total extended distance of said measuring tape from said outer end to said tape outlet opening, an inner measurement of said at least two sets of measurements displaying the total distance between said outer end of said rear tail and said outer end of said forward tongue such that outer and inner measurements are simultaneously displayed on said measuring tape; and said inner measurement including the length of said rear tail plus the length of said forward tongue plus the length of said tape housing between said tape outlet opening and the connection of said rear tail to said tape housing plus the total extended distance of said measuring tape from said outer end to said tape outlet opening ($L_{Rear\ Tail}+L_{Forward\ Tongue}+L_{Tape\ Housing}+L_{Tape}$) whereby the total distance between the outer end of said rear tail and said outer end of said forward tongue is shown by said inner measurement free of addition of the individual length measurements of each of the rear tail, forward tongue, tape housing and measuring tape.

6. A linear measuring device comprising:

a tape housing having an outer surface, a tape outlet opening and inner volume;

a generally semi-flexible measuring tape housed within said tape housing in a generally spiral configuration with an outer end extendable through said tape outlet opening;

an extendable generally flat planar rear tail having an outer end and an inner end and a fixed length as measured between said outer end and said inner end, said rear tail movably mounted on said tape housing generally opposite said tape outlet opening, said rear tail operative to project outwards from said tape housing;

a generally flat planar forward tongue having inner and outer ends, said inner end of said forward tongue hingedly mounted on said outer end of said measuring tape with said forward tongue extending forwards therefrom, said forward tongue being pivotable between a retracted position in general parallel alignment with and contacting said measuring tape and an extended position extending outwards generally parallel with said measuring tape, said outer end of said forward tongue being free of projecting objects mounted thereon whereby said outer end of said forward tongue is operative to be extended into narrow openings;

at least two sets of measurements displayed on said measuring tape, an outer measurement of said at least two sets of measurements displaying the total extended distance of said measuring tape from said outer end to said tape outlet opening, an inner measurement of said at least two sets of measurements displaying the total distance between said outer end of said rear tail and said outer end of said forward tongue such that outer and inner measurements are simultaneously displayed on said measuring tape.

* * * * *

UNITED STATES PATENT AND TRADEMARK OFFICE
CERTIFICATE OF CORRECTION

PATENT NO. : 6,918,191 B2  Page 1 of 1
APPLICATION NO. : 10/700943
DATED : July 19, 2005
INVENTOR(S) : Gene Stauffer and Stephen Goecke It is certified that error appears in the above-identified patent and that said Letters Patent is hereby corrected as shown below:

On Title page (item 54) and column 1, Line 1
The title of the invention was misprinted by the Patent Office during the issuance of the application as "Duel Option Tape Measure".

The correct title should read --Dual Option Tape Measure--, and correction is hereby respectfully requested.

Signed and Sealed this

Fourteenth Day of November, 2006

JON W. DUDAS
*Director of the United States Patent and Trademark Office*